(12) United States Patent
Shiau et al.

(10) Patent No.: US 8,136,975 B2
(45) Date of Patent: Mar. 20, 2012

(54) OPTICAL FILM APPLIED TO A SIDE-EMITTING BACKLIGHT MODULE

(75) Inventors: Tzeng-Ke Shiau, Hsinchu (TW); Ching-Shiang Li, Hsinchu (TW); Wen-Bin Chou, Hsinchu (TW); Chih-Jen Tsang, Hsinchu (TW)

(73) Assignee: Coretronic Corporation (TW)

( * ) Notice: Subject to any disclaimer, the term of this patent is extended or adjusted under 35 U.S.C. 154(b) by 365 days.

(21) Appl. No.: 12/230,342

(22) Filed: Aug. 28, 2008

(65) Prior Publication Data
US 2009/0185385 A1 Jul. 23, 2009

(30) Foreign Application Priority Data

Jan. 17, 2008 (TW) ................................ 97101749 A

(51) Int. Cl.
*F21V 7/04* (2006.01)
(52) U.S. Cl. ....... 362/606; 362/97.2; 362/607; 362/618; 362/620
(58) Field of Classification Search ............ 349/61–65; 362/97.1–97.4, 606–607, 617–620, 627
See application file for complete search history.

(56) References Cited

U.S. PATENT DOCUMENTS

| | | | |
|---|---|---|---|
| 5,600,462 A | | 2/1997 | Suzuki et al. |
| 7,085,060 B2 * | | 8/2006 | Matsushita et al. ............ 359/599 |
| 2003/0095332 A1 * | | 5/2003 | Gardner et al. ................ 359/599 |
| 2006/0245212 A1 | | 11/2006 | Wei et al. |

FOREIGN PATENT DOCUMENTS

| | | |
|---|---|---|
| CN | 101191845 | 12/2006 |
| CN | 200810083219 | 4/2010 |
| TW | 200527016 A | 1/1994 |
| TW | 200613855 A | 8/1994 |
| TW | M305348 | 8/1995 |
| TW | 200804861 A | 3/1996 |

OTHER PUBLICATIONS

Office Action issued by State Intellectual Property Office of the P.R.C(SIPO) for Chinese Patent Application No. 200810083219.7, dated Jul. 29, 2011 (6 pages).
Office Action from Taiwan Intellectual Property Office (TIPO) for Taiwanese Patent Application No. 097101749, mailed Jul. 20, 2011 (13 pages).

* cited by examiner

*Primary Examiner* — Jason Moon Han
(74) *Attorney, Agent, or Firm* — Bacon & Thomas, PLLC

(57) ABSTRACT

An optical film is applied to a side-emitting backlight module. The side-emitting backlight module has a light guide plate for guiding a chief light beam. The light guide plate has a light emitting surface to define a normal direction thereof. The optical film includes a lower prism structure, an intermedium layer, and an upper prism structure. The lower prism structure is disposed on the light emitting surface. The intermedium layer is connected between the lower prism structure and the upper prism structure. When the chief light beam exits from the light emitting surface of the light guide plate, and then goes through the lower prism structure, it goes through the intermedium layer along a changed traveling direction. When the chief light beam exits from the intermedium layer, and goes through the upper prism structure, it turns from the changed traveling direction to the normal direction.

10 Claims, 3 Drawing Sheets

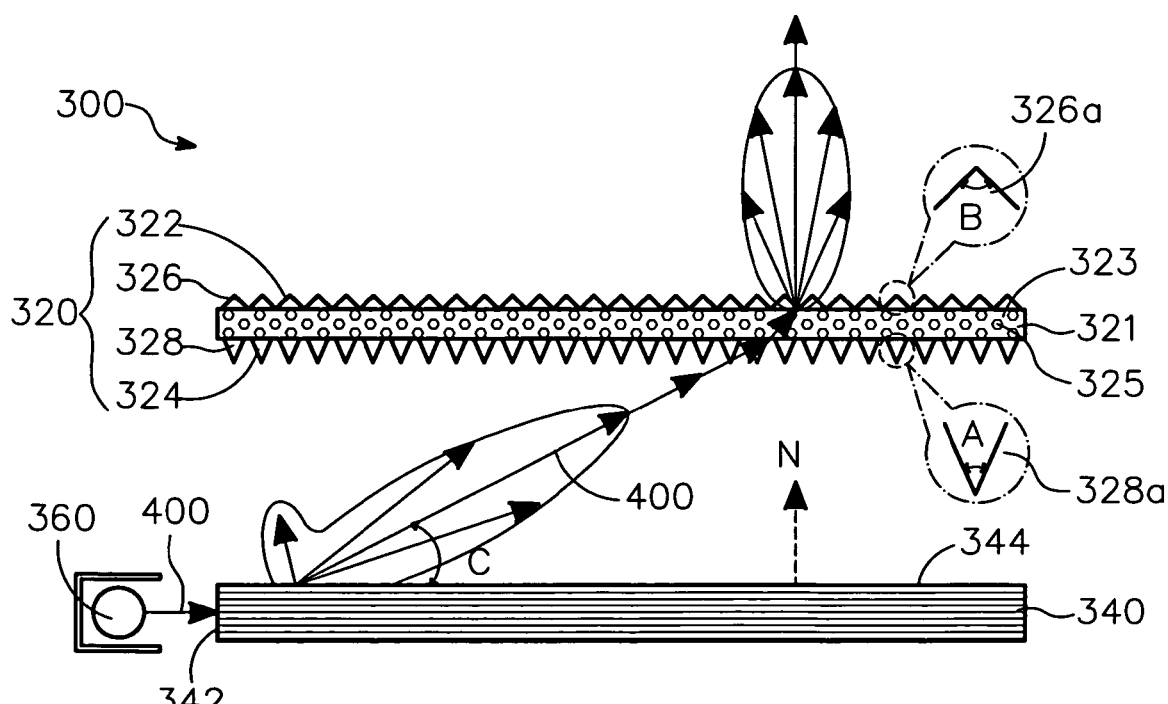
F I G . 3

OPTICAL FILM APPLIED TO A SIDE-EMITTING BACKLIGHT MODULE

BACKGROUND OF THE INVENTION (1) Field of the Invention

The present invention relates to an optical film, and more particularly relates to an optical film applied in a side-emitting backlight module.

(2) Description of the Prior Art

The optical films, such as diffusion film and brightness enhancement film are commonly used in the side-emitting backlight module of the notebook or display to concentrate light and enhance brightness.

Referring to FIG. 1, a conventional side-emitting backlight module 100 includes an top diffusion film 110, an brightness enhancement film 120 for enhancing the brightness in an X-axis direction, a brightness enhancement film 130 for enhancing the brightness in a Y-axis direction, a lower diffusion film 140, a light guide plate 150, a reflector 160, a light source 170, a lamp holder 180 and an outer frame 190, in which the top diffusion film 110, the bottom diffusion film 140, the brightness enhancement films 120 and 130 and the light guide plate 150 are the core technology and cost.

As above mentioned, the side-emitting backlight module 100 has two brightness enhancement films 120 and 130. However, a substitute technology has been raised, called V-Cut.

Referring to FIG. 2, a backlight module 200 using V-Cut technology has a diffusion film 220, a reverse prism sheet 240 and a light guide plate 260. In the V-Cut technology, a microstructure (not shown) is directly fabricated on the upper or lower surface of the light guide plate 260, and the reverse prism sheet 240 with a face-down prism-like structure replaces the two brightness enhancement films 120 and 130 in FIG. 1

Referring to FIG. 2, the light exited from the light guide plate 260 generates total reflection in the prism-like structure located at the underside of the reverse prism sheet 240 when passing the reverse prism sheet 240, by which the light gets out upwards vertically from the reverse prism sheet 240 and then goes through the diffusion film 220, so as to get the effect of shielding the dot pattern and a predetermined diffusion angle. Compared to FIG. 1, the V-Cut technology does not need the brightness enhancement films 120 and 130, as well as the top diffusion film 110 and the bottom diffusion film 140, which saves the cost and lightens the backlight module 200.

However, the backlight module manufactures try their best to decrease the cost, the only way to decrease the cost is to simplify the backlight module by reducing the number of the optical films. The backlight module 200 in FIG. 2 has not integrate the reverse prism sheet 240 and the diffusion film 220 yet, which meant the cost and fabrication threshold still may be lowered.

SUMMARY OF THE INVENTION

The present invention is to provide an optical film and a side-emitting backlight module using the optical film to reduce manufacturing cost and simplify fabricating steps.

For achieving one, some or all of the above mentioned object, an optical film applied in a side-emitting backlight module is provided as an embodiment of the present invention. The side-emitting backlight module includes a light guide plate to guide a chief light beam. The light guide plate has a light emitting surface to define a normal direction thereof. The optical film includes a lower prism structure, an intermedium layer and an upper prism structure. The lower prism structure is disposed on the light emitting surface. The intermedium layer is connected to the lower prism structure and disposed on the lower prism structure. The upper prism structure is connected to the intermedium layer and disposed on the intermedium layer, in which the intermedium layer located between the lower prism structure and the upper prism structure, as a continual entity. After the chief light beam exits from the light emitting surface of the light guide plate and goes through the lower prism structure, the chief light beam goes through the intermedium layer along a changed traveling direction. After the chief light beam exits from the intermedium layer and goes through the upper prism structure, the light beam is turned from the changed traveling direction to the normal direction.

In a preferred embodiment, the present invention provides a side-emitting backlight module including the above optical film, light guide plate and a light source. The light guide plate is disposed under the lower prism structure of the optical film and includes a light emitting surface and a light incident surface. The light source is disposed by side of the light incident surface of the light guide plate. After the light source emits the chief light beam, the chief light beam enters the light guide plate through the light incident surface and exits from the light emitting surface. Then, the chief light beam enters the lower prism structure of the optical film and exits from the upper prism structure.

In a preferred embodiment, the lower prism structure includes a plurality of first prisms. Each one of the first prisms has a vertex angle between the range from 30 to 70 degree. The upper prism structure has a plurality of second prisms. Each one of the second prisms has a vertex angle between the range from 70 to 110 degree.

In a preferred embodiment, the intermedium layer of the optical film further includes a glue layer and a diffusing agent, and the diffusing agent is mixed with the glue layer. The diffusing agent may be a plurality of particles.

In a preferred embodiment, each one of the first prisms in the lower prism structure corresponds to one of the different second prisms in the upper prism structure.

In a preferred embodiment, the upper prism structure includes a rounded-corner structure or a random microstructure.

In conclusion, the side-emitting backlight module using the optical film of the present invention may save the number of the diffusion films and will not effect the brightness.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The present invention will now be specified with reference to its preferred embodiments illustrated in the drawings, in which

FIG. 3 is a schematic view showing the embodiment of the side-emitting backlight module according to the present invention;

DESCRIPTION OF THE PREFERRED EMBODIMENTS

Figure 1:
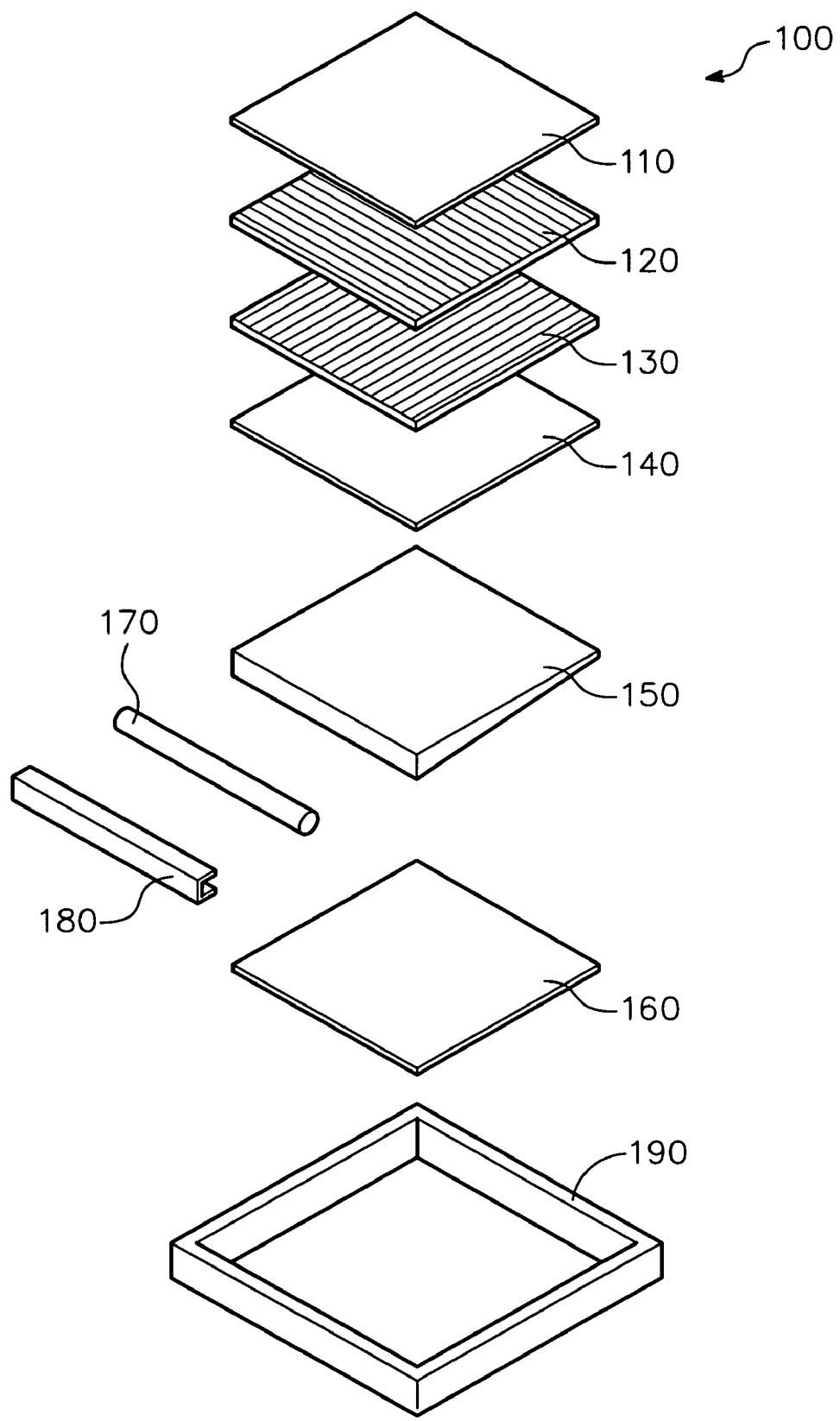
FIG. 1 is a schematic view of the conventional side-emitting backlight module.
Figure 2:
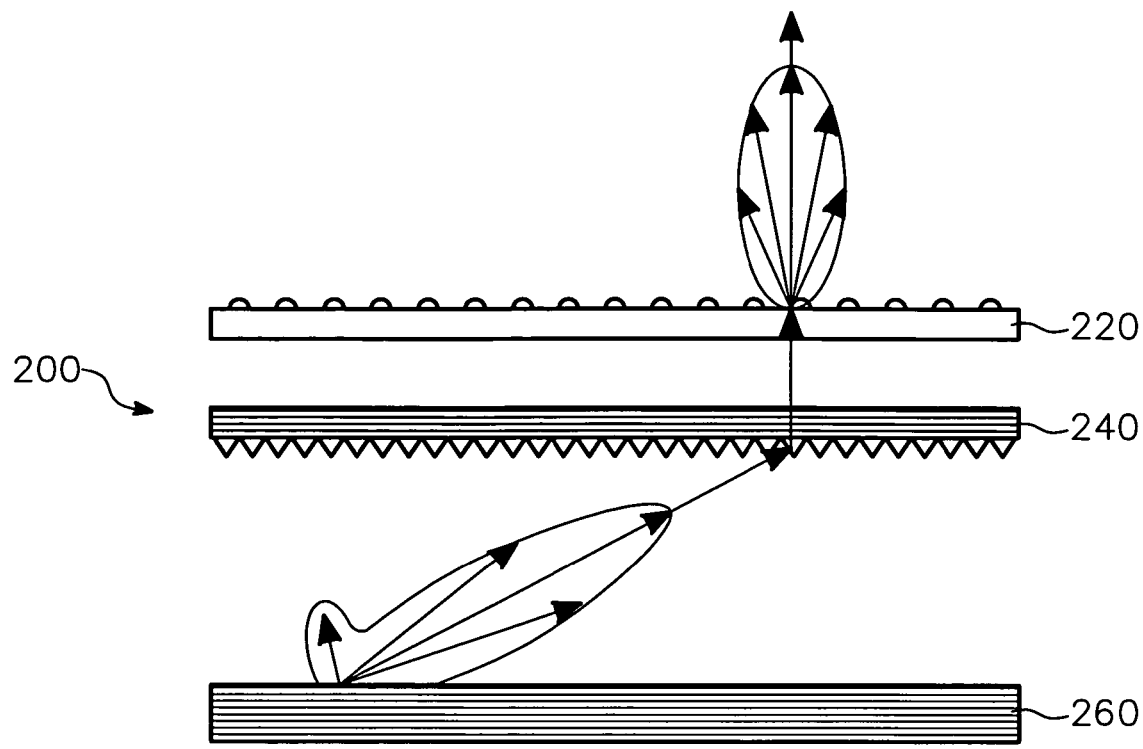
FIG. 2 is a schematic view of another conventional side-emitting backlight module.

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention may be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "including," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Refer to FIG. 3, a side-emitting backlight module 300 includes an optical film 320, a light guide plate 340 and a light source 360. The optical film 320 has an upper surface 322 and a lower surface 324. The lower surface 324 faces the upper surface 322. The upper surface 322 is the surface of an upper prism structure 326, while the lower surface 324 is the surface of a lower prism structure 328. There is an intermedium layer 321 located between the upper prism structure 326 and the lower prism structure 328. The intermedium layer 321 connects with the two prism structures 326, 328 and is a continual entity. The light guide plate 340 with a light incident surface 342 and a light emitting surface 344 is disposed under the lower surface 324 of the optical film 320. The light emitting surface 344 faces the lower prism structure 328 of the optical film 320 and defines a normal direction N, vertical to the light emitting surface 344 (dotted lines in the FIG. 3). The light source 360 is disposed by side of the light incident surface 342 of the light guide plate 340.

The light beams emitted from the light source 360, such as a cold cathode fluorescent lamp or a plurality of light emitting diodes (LEDs), contains a chief light beam 400 and several weak subsidiary light beams (not marked) around the chief light beam 400. The chief light beam 400 emitted from the light source 360, enters the light guide plate 340 through the light incident surface 342 and exits from the light emitting surface 344. Then, the chief light beam 400 enters the lower prism structure 328 of the optical film 320 and exits from the upper prism structure 326.

The lower prism structure 328 and the upper prism structure 326 are used to deflect the chief light beam 400 toward the normal direction N of the light emitting surface 344 of the light guide plate 340. In this embodiment, the upper prism structure 326 is disposed under a liquid crystal panel (not shown). After exiting from the light emitting surface 344 and through the lower prism structure 328, the chief light beam 400 goes along a changed traveling direction (direction a or b in FIG. 5) and through the intermedium layer 321. After exiting from the intermedium layer 321 and through the upper prism structure 326, the chief light beam 400 turns to the normal direction N from the changed traveling direction a or b. In other words, when the chief light beam 400 exits from the upper prism structure 326, its direction is substantially parallel to the normal direction N of the light emitting surface 344. Namely, the chief light beam 400 is vertical to the liquid crystal display. Thus, the optical film 320 is capable of enhancing the brightness of the liquid crystal display and ensuring the uniformity of the brightness.

The light guide plate 340 which is the medium of the chief light beam 400 controls the direction of the chief light beam 400. The light guide plate 340 is made by injection molding method pressing materials like polymethylmethacrylate (PMMA) into smooth plate and printing dot patterns on the bottom of the plate by screen printing with high light reflecting and light non-absorbing material (not shown).

The light guide plate 340 may be a wedge plate, with a thick end and a thin end. The light source 360 is disposed by the thick end of the light guide plate 340. The chief light beam 400 emitted from the light source 360 transfers from the thick end to the thin end after entering the light guide plate 340 by total reflection. When the chief light beam 400 meets the dot patterns, it is reflected in all directions and exits from the light emitting surface 344 of the light guide plate 340. By the way, with patterns of different spacing and sizes, the light exits from the light guide plate 340 evenly.

In a preferred embodiment, the lower prism structure 328 includes a plurality of the first prisms 328a. Each first prism 328a is a triangle with a vertex angle "A" between the range from 30 to 70 degree. The distance between two adjacent first prisms is 5 um~1000 um. The upper prism structure 326 has a plurality of second prisms 326a. Each second prism 326a is a triangle with a vertex angle "B" between the range from 70 to 110 degree. The distance between two adjacent second prisms is 5 um~1000 um. The first prism 328a and the second prism 326a have many possible settings, for example, each first prism 328a corresponds to one of the different second prisms 326a; the distance between two adjacent first prisms 328a equals to the distance between two adjacent second prisms 326a.

In addition, both the upper prism structure 326 and the lower prism structure 328 may be replaced by a prism-like structure or a macro lens-like structure. When a angle "C" between the chief light beam 400 and the light emitting surface 344 is 10 to 50 degree, especially 20 degree, the traveling direction of the chief light beam 400 is easily guided parallel to the normal direction N by the lower prism structure 328, the intermedium layer 321 and the upper prism structure 326.

The intermedium layer 321 of the optical film 320 has a glue layer 323 and a diffusing agent 325. The glue layer 323 is mixed with the diffusing agent 325. Incidentally, the materials of the upper prism structure 326 or the lower prism structure 328 may be polyethylene terephthalate (PET) or polycarbonate (PC). The glue layer 323 may be UV glue. The diffusing agent 325 uses a plurality of organic or inorganic particles to make the light uniform, increase the diffusion angle of the chief light beam 400 and enhance the effect of shielding the dot pattern. It is to be noticed that all above materials are for reference, not limited.

Figure 4A:
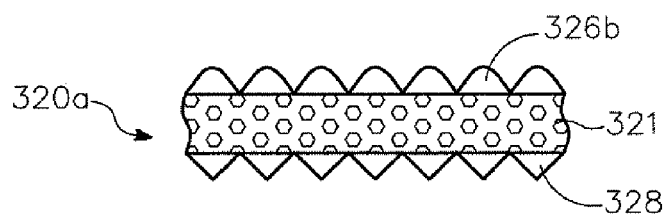
FIG. 4A-4C are schematic views of the optical film based on the embodiment of the side-emitting backlight module according to the present invention.
Figure 4B:
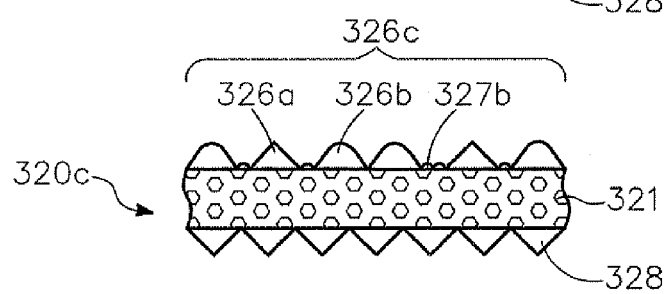
Figure 4C:
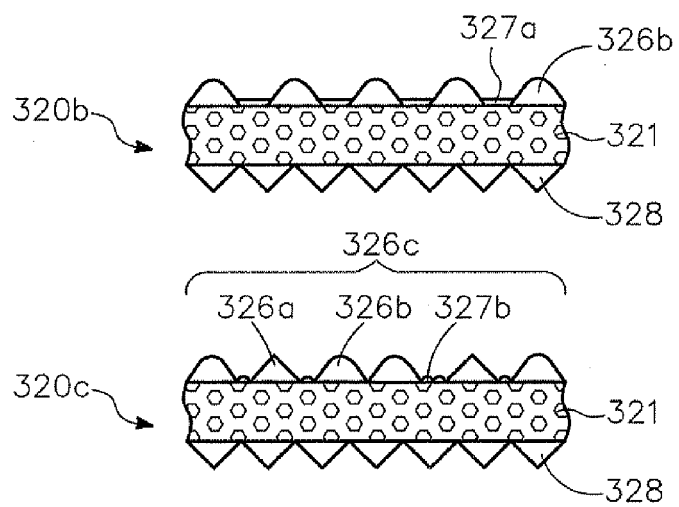

Referring to FIGS. 4A to 4C for different types of the optical films 320a, 320b and 320c. The optical film 320a in FIG. 4A has a rounded-corner structure 326b, which is the passivation of the vertex angle "B" in the upper prism structure 326 in FIG. 3 to get the function of a diffusion film. The optical film 320b in FIG. 4B further includes a microstructure 327a in the rounded-corner structure 326b, which may enhance the light diffusion. The optical film 320c in FIG. 4C further includes a random microstructure 326c which contains the second prism 326a and the rounded-corner structure 326b, as well as the microstructure 327b between the second prism 326a and the rounded-corner structure 326b. In other embodiments, the combination of the second prism 326a, the rounded-corner structure 326b and the microstructure 327b of the random microstructure 326c is not limited. It may be at least one second prism 326a or one rounded-corner structure 326b disposed between two second prisms 326a, or at least one second prism 326a or one rounded-corner structure 326b disposed between two rounded-corner structures 326b. The microstructure 327b may be disposed between the second prism 326a and the rounded-corner structure 326b or between two second prisms 326a or two rounded-corner structures 326b. The random microstructure 326c may enhance the light diffusion to reduce the requirement of the diffusion films.

The above embodiment integrates the diffusion film and brightness enhancement film into only one optical film 320, 320a, 320b or 320c, improving the front brightness of the side-emitting backlight module 300. The integration of the diffusion film and the brightness enhancement film may not only reduce the usage of the reverse prism sheet or/and the diffusion film, but also shorten the assembly time of the side-emitting backlight module 300 as well as enhance the brightness and reduce the cost.

Figure 5:
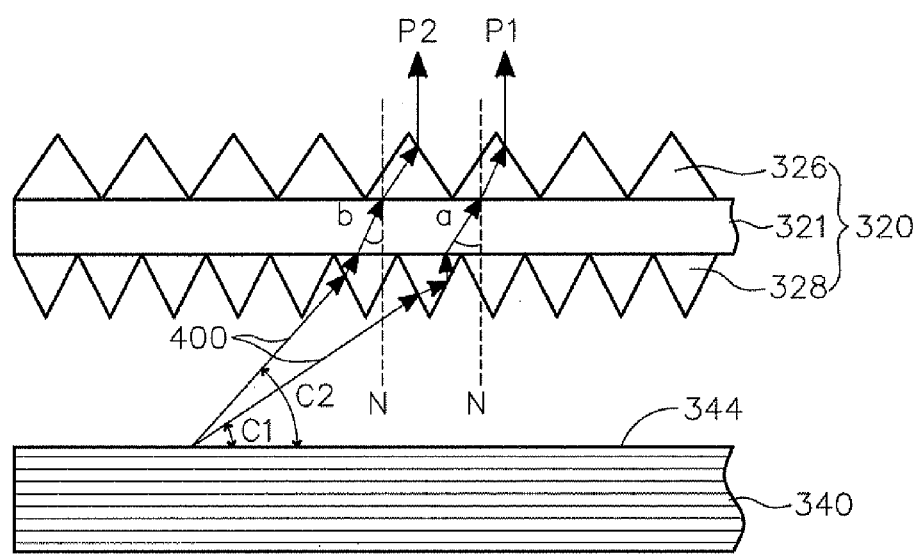
FIG. 5 is a schematic view of the light path in the optical film based on the embodiment of the side-emitting backlight module according to the present invention.

Referring to FIG. 5, C1 and C2 stand for the changes of the angle "C" in FIG. 3. When the angle "C" between the chief light beam 400 and the light emitting surface 344 is C1, the chief light beam 400 travels along the light path P1 after entering the lower prism structure 328. When the angle "C" between the chief light beam 400 and the light emitting surface 344 is C2, the chief light beam 400 travels along the light path P2 after entering the lower prism structure 328. As shown in FIG. 5, the chief light beam 400 may generate total reflection or only refraction after entering the lower prism structure 328.

In the light path P1, after entering the lower prism structure 328, the chief light beam 400 gets into the intermedium layer 321 along the changed traveling direction by a refraction and a total reflection, then into the upper prism structure 326 from the intermedium layer 321 by another refraction. After one more refraction and crossing the upper prism structure 326, the chief light beam 400 follows the front direction of the optical film 320, that is, the normal direction N of the light emitting surface 344 into the liquid crystal panel (not shown).

Noticeably, in the light path P2, after entering the lower prism structure 328, the chief light beam 400 gets into the intermedium layer 321 along the changed traveling direction b by two refractions, then gets into the upper prism structure 326 from the intermedium layer 321 after one more refraction. With one more refraction followed, the chief light beam 400 follows the front direction of the optical film 320 into the liquid crystal panel (not shown).

As shown in FIG. 5, the chief light beam 400 from the light guide plate 340 achieves optimal incident angle to the upper prism structure 326 by the total reflection or refraction in the lower prism structure 328, such as the angle $\theta$ between the normal direction N and the changed traveling direction a or b. The chief light beam 400 is moved towards the normal direction N of the light emitting surface 344 by the upper prism structure 326 to enhance the brightness in the front direction of the liquid crystal panel.

The optical films 320, 320a, 320b, 320c may be applied in the side-emitting backlight module of the Notebook, LCD TV or LCD Monitor. The optical films 320, 320a, 320b, 320c integrate the diffusion plate, the brightness enhancement film and the reverse prism sheet. The side-emitting backlight module 300 using the optical films 320, 320a, 320b, 320c may enhance the brightness in the front direction of the liquid crystal panel without extra diffusion plate, light enhance film or reverse prism sheet.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An optical film, applied in a side-emitting backlight module, having a light guide plate for guiding a chief light beam, which has a light emitting surface to define a normal direction thereof, the optical film comprising:

a lower prism structure, disposed on the light emitting surface and comprising a plurality of first prisms, wherein each of the first prisms has a first flat surface and a second flat surface, and the first flat surface and the second flat surface form a vertex angle between a range from 30 to 70 degree;

an intermedium layer comprising a diffusing agent mixed with a glue layer, connected to the lower prism structure and disposed on the lower prism structure; and an upper prism structure, connected to the intermedium layer and disposed on the intermedium layer and comprising a plurality of second prisms, wherein each of the second prisms has a vertex angle between a range from 70 to 110 degree, the intermedium layer is located between the lower prism structure and the upper prism structure, as a continual entity, wherein after the chief light beam exits from the light emitting surface of the light guide plate and goes through the lower prism structure, the chief light beam is capable of being refracted on the first flat surface, reflected on the second flat surface via total reflection, and then emitted towards the upper prism structure, or the chief light beam is capable of being refracted on the first flat surface and emitted towards the upper prism structure directly, the chief light beam goes through the intermedium layer along a changed traveling direction, and after the chief light beam exits from the intermedium layer and goes through the upper prism structure, the chief light beam is turned from the changed traveling direction to the normal direction.

2. The optical film of claim 1, wherein each of the first prisms is corresponding to one of the different second prisms.

3. The optical film of claim 1, wherein the upper prism structure comprises a rounded-corner structure.

4. The optical film of claim 1, wherein the upper prism structure comprises a random microstructure.

5. The optical film of claim 1, wherein a distance between each of the first prisms is between 5 to 1000 µm and wherein the distance between each of the second prisms is between 5 to 1000 µm.

6. A side-emitting backlight module, comprising:
an optical film, comprising
a lower prism structure, comprising a plurality of first prisms, wherein each of the first prisms has a first flat surface and a second flat surface, and the first flat surface and the second flat surface form a vertex angle between a range from 30 to 70 degree;

an intermedium layer comprising a diffusing agent mixed with a glue layer, connected to the lower prism structure and disposed on the lower prism structure; and an upper prism structure, connected to the intermedium layer and disposed on the intermedium layer and comprising a plurality of second prisms, wherein each of the second prisms has a vertex angle between a range from 70 to 110 degree, the intermedium layer is located between the lower prism structure and the upper prism structure, as a continual entity;

a light guide plate, disposed under the lower prism structure of the optical film, and comprising a light incident surface and a light emitting surface, wherein the light emitting surface faces the lower prism structure and defines a normal direction vertical to the light emitting surface; and a light source, disposed by side of the light incident surface of the light guide plate;

wherein after the light source emits a chief light beam, the chief light beam enters the light guide plate through the light incident surface, exits from the light emitting surface, subsequently, and then goes through the lower prism structure, the chief light beam is capable of being refracted on the first flat surface, reflected on the second flat surface via total reflection, and then emitted towards the upper prism structure, or the chief light beam is capable of being refracted on the first flat surface and emitted towards the upper prism structure directly, the chief light beam goes through the intermedium layer along a changed traveling direction after passing through the lower prism structure, and after the chief light beam exits from the intermedium layer and then goes through the upper prism structure, the chief light turns from the changed traveling direction to the normal direction.

7. The side-emitting backlight module of claim 6, wherein each of the first prisms is corresponding to one of the different second prisms.

8. The side-emitting backlight module of claim 6, wherein the upper prism structure comprises a rounded-corner structure.

9. The side-emitting backlight module of claim 6, wherein the upper prism structure comprises a random microstructure.

10. The side-emitting backlight module of claim 6, wherein a distance between each of the first prisms is between 5 to 1000 µm and wherein the distance between each of the second prisms is between 5 to 1000 µm.

* * * * *